US012631815B2

(12) United States Patent
Wittmann et al.

(10) Patent No.: US 12,631,815 B2
(45) Date of Patent: May 19, 2026

(54) VEHICLE PANE AND METHOD OF MANUFACTURING THE SAME

(71) Applicant: ams-OSRAM International GmbH, Regensburg (DE)

(72) Inventors: Sebastian Wittmann, Regenstauf (DE); Uli Hiller, Bad Abbach (DE); Michael Brandl, Mintraching (DE)

(73) Assignee: AMS-OSRAM INTERNATIONAL GMBH, Regensburg (DE)

( * ) Notice: Subject to any disclaimer, the term of this patent is extended or adjusted under 35 U.S.C. 154(b) by 0 days.

(21) Appl. No.: 18/682,560

(22) PCT Filed: Aug. 9, 2022

(86) PCT No.: PCT/EP2022/072385
§ 371 (c)(1),
(2) Date: Feb. 9, 2024

(87) PCT Pub. No.: WO2023/017055
PCT Pub. Date: Feb. 16, 2023

(65) Prior Publication Data
US 2024/0280741 A1 Aug. 22, 2024

(30) Foreign Application Priority Data

Aug. 10, 2021 (DE) .................... 10 2021 120 806.8

(51) Int. Cl.
| | |
|---|---|
| *F21V 8/00* | (2006.01) |
| *B32B 17/10* | (2006.01) |
| *B60J 3/00* | (2006.01) |
| *B60Q 3/208* | (2017.01) |
| *B60Q 3/66* | (2017.01) |

(52) U.S. Cl.
CPC ...... *G02B 6/0051* (2013.01); *B32B 17/10036* (2013.01); *B32B 17/10504* (2013.01);
(Continued)

(58) Field of Classification Search
CPC .. G02B 6/0051; G02B 6/0031; G02B 6/0068; G02B 6/009; B60Q 3/208; B60Q 3/66;
(Continued)

(56) References Cited

U.S. PATENT DOCUMENTS

| | | | | |
|---|---|---|---|---|
| 10,150,352 | B2 * | 12/2018 | Salter ......................... | B60J 1/20 |
| 2007/0098969 | A1 | 5/2007 | Ansems et al. | |

(Continued)

FOREIGN PATENT DOCUMENTS

| | | |
|---|---|---|
| CN | 103025580 A | 4/2013 |
| CN | 107107566 A | 8/2017 |

(Continued)

OTHER PUBLICATIONS

International Search Report issued for corresponding International Patent Application No. PCT/EP2022/072385 on Nov. 28, 2022, along with an English Translation (9 pages).
(Continued)

*Primary Examiner* — James R Greece
*Assistant Examiner* — Hana S Featherly
(74) *Attorney, Agent, or Firm* — Hauptman Ham, LLP

(57) ABSTRACT

A vehicle pane includes a light emitting arrangement including a plurality of optoelectronic components on a flexible foil. The vehicle pane also includes a structure including a first pane, a second pane arranged thereon, and at least one at least partially transparent connecting layer connecting the first pane and the second pane. The structure includes an at least partially transparent inner region and an edge region surrounding the inner region. The light emitting arrangement is arranged laterally in the edge region of the structure and the edge region with the light emitting arrangement is configured to direct light generated by the optoelectronic components along the at least partially transparent connecting layer into the at least partially transparent inner region.

30 Claims, 4 Drawing Sheets

(52) U.S. Cl.
CPC .. *B32B 17/10513* (2013.01); *B32B 17/10541*
(2013.01); *B32B 17/10761* (2013.01); *B32B*
*17/10807* (2013.01); *B60J 3/007* (2013.01);
*B60Q 3/208* (2017.02); *B60Q 3/66* (2017.02);
*G02B 6/0031* (2013.01); *G02B 6/0068*
(2013.01); *G02B 6/009* (2013.01); *B32B*
*2307/7376* (2023.05); *B32B 2605/00* (2013.01)

(58) Field of Classification Search
CPC ........ B32B 17/10036; B32B 17/10504; B32B
17/10513; B32B 17/10541; B32B
17/10761; B32B 17/10807; B32B
2307/7376; B32B 2605/00; B60J 3/007
USPC ......................................................... 362/606
See application file for complete search history.

(56) References Cited

U.S. PATENT DOCUMENTS

| | | | |
|---|---|---|---|
| 2009/0103298 | A1 | 4/2009 | Boonekamp et al. |
| 2012/0320621 | A1 | 12/2012 | Kleo et al. |

| | | | |
|---|---|---|---|
| 2015/0165965 | A1 | 6/2015 | Masaki et al. |
| 2016/0325529 | A1 | 11/2016 | Linthout et al. |

FOREIGN PATENT DOCUMENTS

| | | | |
|---|---|---|---|
| DE | 10 2006 055 407 | A1 | 5/2007 |
| DE | 10 2013 003 686 | A1 | 9/2014 |
| DE | 20 2017 001 084 | U1 | 4/2017 |
| DE | 20 2017 105 582 | U1 | 1/2019 |
| EP | 0 913 626 | A1 | 5/1999 |
| EP | 3 925 774 | A1 | 12/2021 |
| FR | 3 088 035 | A1 | 5/2020 |
| WO | 2013/053629 | A1 | 4/2013 |
| WO | 2016/062299 | A2 | 4/2016 |
| WO | 2016/102800 | A1 | 6/2016 |

OTHER PUBLICATIONS

Written Opinion issued for corresponding International Patent Application No. PCT/EP2022/072385 on Nov. 28, 2022 (10 pages).

* cited by examiner

VEHICLE PANE AND METHOD OF MANUFACTURING THE SAME

CROSS REFERENCE TO RELATED APPLICATION

This application is a National Stage of International Application No. PCT/EP2022/072385, filed on Aug. 9, 2022, which designates the United States and was published in Europe, and which claims priority to German Patent Application No. 10 2021 120 806.8, filed on Aug. 10, 2021, in the German Patent Office. All of the aforementioned applications are hereby incorporated by reference in their entireties.

BACKGROUND OF THE INVENTION

For vehicle panes, adjustable tinting or darkening is already well known. However, there is also an increasing demand for lighting variants that require a uniform ambience and indirect lighting through the vehicle panes. Solutions already exist for this, but they are either prone to faults and errors or require a high amount of space.

Accordingly, there is still a need for cost-effective and easy-to-produce solutions that still allow a high degree of flexibility.

SUMMARY OF THE INVENTION

This need is met by the independent patent claims. Further developments and embodiments are the subject of the dependent claims.

As a solution to the problems mentioned at the beginning, the inventors now propose integrating light emitting elements into the edge regions of a pane and using waveguides to direct the light into a central area of the pane from which it then emerges. In this way, not only is the space required for such an installation reduced, but the luminous efficacy is also increased by the integrated arrangement.

This reduces power consumption and the otherwise larger dimensions of the light sources required. In some aspects, a vehicle pane is thus proposed which comprises a structure comprising of a first pane and a second pane arranged thereon. The two panes are connected to each other by means of an at least partially transparent connecting layer. According to the proposed principle, the structure comprises an at least partially transparent inner region and an edge region surrounding the inner region.

A light emitting arrangement is also provided, which comprises a plurality of optoelectronic components on a flexible foil, the light emitting arrangement being arranged laterally in the edge region of the structure and the edge region with the light emitting arrangement being configured to direct light generated by the optoelectronic components along the at least partially transparent connecting layer into the at least partially transparent inner region.

The connecting layer thus acts as a waveguide that directs the light generated in the edge region into the inner region so that it can decouple from the vehicle pane and create the desired ambient lighting impression. The integration into the edge region allows light to be directed into the inner region thanks to the waveguide effect. It also simplifies production, as the light sources themselves no longer need to be located in the inner region, thus eliminating the need for long and failure-prone supply lines, which are also visually disruptive.

The term pane refers to a transparent solid material that is suitable for a window pane, a transparent roof or another form in a motor vehicle such as a car, airplane or train. Such a pane can be made of glass, but also of PMMA or another transparent plastic. In addition, a pane can also have a layered structure, i.e. consist of several individual elements bonded together.

In some aspects, the edge region is concealed, i.e. not visible and, in addition to integrating the light emitting arrangement, can also be designed as a fastening device of the vehicle pane.

In some aspects, a reflector layer is also provided, which covers a surface of the edge region of the light emitting arrangement at least along a longitudinal edge of the light emitting arrangement. The reflector layer can also be arranged on the entire surface of the edge region. A diffuser layer can also be arranged between the reflector layer and the edge region so that the light distribution is as homogeneous as possible. The reflector layer increases the luminous efficacy, as light emitted outwards is deflected back towards the inner region.

Some aspects relate to the configuration and arrangement of the light emitting arrangement and the optoelectronic components in relation to the edge region. In some aspects, the light emitting arrangement and the optoelectronic components are arranged within the connecting layer in the edge region. Alternatively, the light emitting arrangement may be laterally disposed on at least one of the first and second pane with the optoelectronic components facing the connecting layer. In some aspects, there may be two light emitting arrangements on both panes. Similarly, in such an embodiment it may be useful to mirror the respective other side of the structure in the edge region so that the light emitted by the components is reflected back into the structure.

In some aspects, the flexible foil of the light emitting arrangement can be designed as a reflective foil or comprise a reflective back surface. This is useful to further increase the light output. A further aspect deals with the arrangement of the components on the foil in relation to the inner region. The background to this is a possible color mixture of the components and the desire in some embodiments to achieve as homogeneous a distribution as possible. The components can be volume emitters, but can also be configured as side emitters. It is therefore possible, if necessary, to place Bragg mirrors on the surface of the components in order to increase the radiation to the side.

In some aspects, the optoelectronic components are arranged on the flexible foil such that a lateral distance of two adjacent optoelectronic components from a center of the light emitting arrangement is different in a cross-section through the light emitting arrangement. In other words, several components are arranged next to one another so that at least one inner component, i.e. one closer to the center point, and one outer component are arranged in a row. Alternatively, the optoelectronic components can also be arranged on the flexible foil in at least one row along the edge region. Combinations are also possible here, so that, for example, the components form two or more strips that are at different distances from a parallel axis running through the center point.

In some examples, the light emitting arrangement runs either in one piece or in several pieces along the edge region and thus surrounds the inner region. The components can thus be arranged on or along a virtual rectangle on the flexible foil.

Some aspects deal with the generation of different colors or even white light. In some aspects, the optoelectronic components each comprise semiconductor chips that are designed to emit light of different wavelengths, in particular red, green and blue. This means that almost any color or color gradient can be generated by appropriate control. It would be possible to couple these with acoustic or other signals in order to create a corresponding ambience or to transmit information. Alternatively, the optoelectronic components can each comprise semiconductor chips that have a converter material for generating a mixed light, in particular a white light. The converter material can surround the semiconductor chips, but can also be formed as converter particles in the at least partially transparent connecting layer. The gradient of these converter particles in the connecting layer is inhomogeneous in some aspects in order to generate a uniform color conversion.

In some other aspects, the connecting layer comprises scattering particles. The scattering particles improve the extraction of light from the vehicle pane so that the desired ambient lighting is created in the inner region. In some embodiments, the scattering particles are distributed inhomogeneously in the connecting layer to create an illumination pattern. Additionally, scattering particles may be provided only in the inner region and not in the edge region. In some aspects, the connecting layer comprises a foil printed with scattering particles, the printed side of which is particularly adjacent to one of the first and second pane.

Such a printed foil can be easily produced with the desired pattern and integrated into the connecting layer. In some further aspects, the connecting layer can also comprise a layer that is tinted in at least some areas. Alternatively or additionally, in some embodiments, a foil whose transparency can be adjusted is integrated into the connecting layer. The foil whose transparency can be adjusted is arranged in the inner region and comprises, for example, in particular a foil with liquid crystals or an electrochromic foil.

The material of the connecting layer can be varied. For example, polyvinyl butyral (PVB) or another plastic from the polyvinyl acetal group is suitable for this purpose. In another aspect, the connecting layer is at least partially implemented with a reflective material in the edge region. This may be disposed between an edge of the edge region and the light emitting arrangement to reflect emitted light into the inner region. In some aspects, the reflective material is provided by means of a PVB foil that forms part of the connecting layer after completion of the structure. In another aspect, the reflective material is provided on a side of the flexible foil facing away from the optoelectronic components. Light that is emitted from the components in the direction of the flexible foil is reflected back by the reflective material and can thus return to the connecting layer.

Alternatively, the reflective material can also be formed by reflective foil portions arranged around the light emitting arrangement and/or the components. In some aspects, the thickness of the connecting layer is between 40 μm and 1000 μm, depending on the embodiment. The connecting layer can be made up of individual layers that have been laminated together by the action of heat and pressure, so that an essentially continuous layer is formed. If scattering particles, converter particles or other materials are used in the individual layers, the lamination process causes these particles to diffuse. Nevertheless, a certain inhomogeneity and a certain gradient of these particles in the connecting layer is likely to occur even after the lamination process.

Another aspect relates to a method of manufacturing a vehicle pane.

For example, in the case of a vehicle pane with an inner region and an edge region surrounding the area, it is proposed to provide a first pane and a second pane in a first step. An at least partially transparent first foil layer is then applied to the first pane and a second foil layer is arranged on top of this.

The second foil layer can at least partially comprise scattering particles in the inner region. Subsequently or simultaneously, a light emitting arrangement, in particular in the form of a strip with a flexible foil and an optoelectronic semiconductor component arranged thereon, is arranged in an edge region on the first or second foil layer. Depending on the configuration, the flexible foil can be applied to the first or second foil layer and lightly pressed in; alternatively, the light emitting arrangement can also be applied to the foil layers with the optoelectronic components first. In the latter case, the components can be easily pressed into the first or second foil layer.

Subsequently, at least a third partially transparent foil layer is applied to the second foil layer and the light emitting arrangement in the edge region so that the light emitting arrangement is completely covered or encapsulated by the foil layers. In a final step, the second pane is arranged on the third foil layer.

The individual foil layers now form a connecting layer by melting them together to bond the first and second pane. This results in an essentially uniform connecting layer with scattering particles in the inner region, wherein the optoelectronic semiconductor components of the light emitting arrangement are also located within the connecting layer created by the foil layers. In this embodiment, the connecting layer thus acts as a waveguide and can deflect the light emitted by the optoelectronic components in the direction of the inner region.

In a further aspect of the method, a diffuser particle or reflector layer is additionally arranged in the edge region on the surface of the first and/or second pane. In particular, it can be provided to form this diffuser and reflector layer at least along a longitudinal edge of the pane, so that light generated by the optoelectronic components is reflected back into the connecting layer.

In a further aspect, the flexible foil of the light emitting arrangement can also be designed as a reflective foil or with a reflective back surface. All these measures increase the luminous efficacy, as light that is not emitted directly into the inner region is reflected by the reflective materials in the edge region and can therefore still reach the inner region.

A further aspect allows the inner region to be additionally darkened. For this purpose, a foil with adjustable transparency is placed on the first or second foil layer in the inner region during production. The transparency-adjustable foil can, in particular, comprise a foil with liquid crystals or an electrochromic foil. In this respect, various aspects can be realized in the inner region, for example the generation of an illumination pattern by an inhomogeneous distribution of scattering particles or a foil printed with scattering particles as well as an additional tinting by an electrochromic foil.

Another aspect deals with the formation of reflective materials that suitably surround the light emitting arrangement within the connecting layer and thus reflect emitted light into the inner region. The reflective materials used for this purpose can be individual foil portions on the one hand, but also reflector materials that are applied in or for the individual foils during the manufacturing process. The subsequent lamination process causes these reflector particles to mix or diffuse, so that they surround the light emitting arrangement and deflect the light emitted by the optoelectronic components in the direction of the inner region. For this purpose, the optoelectronic components can also be designed as so-called side emitters for improved light coupling into the inner region.

SHORT DESCRIPTION OF THE DRAWINGS

Further aspects and embodiments according to the proposed principle will become apparent with reference to the various embodiments and examples described in detail in connection with the accompanying drawings.

DETAILED DESCRIPTION

The following embodiments and examples show various aspects and their combinations according to the proposed principle. The embodiments and examples are not always to scale. Likewise, various elements may be shown enlarged or reduced in size in order to emphasize individual aspects. It is understood that the individual aspects and features of the embodiments and examples shown in the figures can be readily combined with each other without affecting the principle of the invention. Some aspects have a regular structure or shape. It should be noted that slight deviations from the ideal shape may occur in practice without, however, contradicting the inventive concept.

In addition, the individual figures, features and aspects are not necessarily shown in the correct size, and the proportions between the individual elements are not necessarily correct. Some aspects and features are emphasized by enlarging them. However, terms such as "above", "above", "below", "below", "larger", "smaller" and the like are shown correctly in relation to the elements in the figures. It is thus possible to deduce such relationships between the elements on the basis of the figures.

Figures 1, 2:
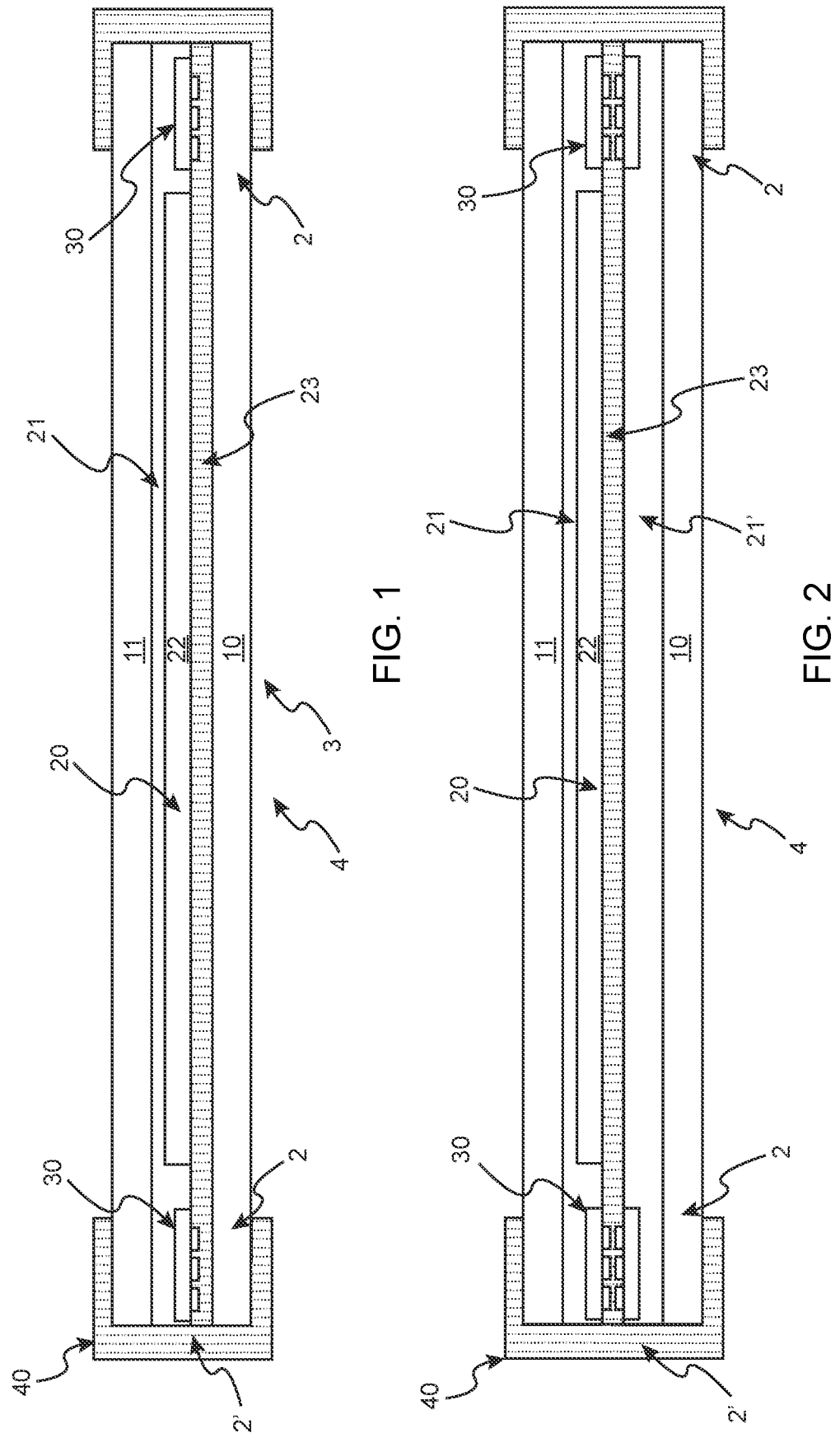
FIG. 1 shows a first embodiment of a vehicle pane with some aspects of the proposed principle.
FIG. 2 shows a second embodiment of a vehicle pane with some aspects of the proposed principle.

FIG. 1 shows a first embodiment of a vehicle pane which realizes some aspects of the proposed principle. The vehicle pane is made up of two panes 10 and 11, which are intimately connected to each other via a connecting layer 20. In this way, a structure 4 is formed, which is further divided into an inner region 3 and an edge region 2 surrounding the inner region 3. The inner region 3 is at least partially transparent so that an occupant of the vehicle can see through the inner region 3. The vehicle pane produced in this way can be part of a motor vehicle, for example, and can be implemented in the roof structure or as a window.

The structure of the vehicle pane and the connecting layer 20 has a multi-layer structure and in the embodiment comprises a first foil 21, as well as a second foil 23 and a third foil 22 arranged between the first and second foils. The third foil 22 is designed as a liquid crystal foil, LC or al PDLC foil, and thus enables adjustable darkening or tinting of the inner region of the vehicle pane. LC foils are polarizing and PDLC foils are not, which can be exploited in some applications. The two outer foils 21 and 23 as a layered structure are made, for example, with a PVB material, which serves to connect the two panes. In the manufacture of such a vehicle pane, the PVB material is applied as a foil as shown and then bonded to the pane by applying heat and pressure. The effect of the heat causes the foil layers to melt so that, after cooling down again, an essentially uniform connecting layer 20 is formed in which the liquid crystal foil 22 is embedded.

To create an illumination pattern, the PVB foil 23 is also printed with scattering particles so that, as will be explained later, light introduced into the connecting layer is scattered by the scattering particles and emitted to the outside.

According to the proposed principle, a light emitting arrangement 30 is now provided in the edge region 2 of this structure. This is designed as a transparent flexible foil with optoelectronic components arranged on it, whereby the components are arranged in several rows as shown here. The arrangement thus causes components to be at different distances from the center of the inner region 3. In the embodiment shown, the light emitting arrangement 30 is inserted within the connecting layer and in particular between the two PVB foils and then laminated to them.

When the light emitting arrangement is in operation, the optoelectronic components emit light in different directions and therefore exhibit Lambertian radiation behavior. Diffuse and reflective elements 40 are also provided in the edge region 2 in order to redirect the light emitted by these components in the connecting layer onto or into the inner region. These completely surround the surface of the edge region and, in particular, the side edge of the edge regions of the structure, thus reflecting the emitted light back into the connecting layer.

Due to the different refractive indices between the pane 10 and 11 on one side and the connecting layer 20 on the other side, a waveguide is created within the connecting layer, which directs the light emitted by the components within the connecting layer into the inner region 3. There it is scattered by the scattering particles and emitted to the outside.

In this way, an indirectly illuminated pane structure is created, which allows different color or brightness patterns when the individual components are controlled appropriately. In addition, the scattering particles can be distributed inhomogeneously and, for example, depict an icon or another defined shape that is indirectly illuminated by the light emitted from the edge region.

The arrangement of the vehicle pane with the components within the connecting layer according to the invention has several advantages over conventional arrangements with components on the side edge of the structure. Firstly, the implementation within the connecting layer significantly improves the luminous efficacy, especially if the connecting layer is only a few micrometers thick. In conventional solutions, where the optoelectronic components are arranged along the side edge, it is much more difficult to couple the light into the thin intermediate layer due to the small axial dimensions.

In addition, the supply lines to the individual optoelectronic components can be shorter and not visible to the user due to their proximity to the edges. In particular, it is also possible to implement the edge region surrounded by the reflector layer as a holding area, so that only the inner region indirectly illuminated by the optoelectronic components is visible to the user.

FIG. 2 shows a further embodiment with an even stronger luminosity according to the proposed principle, depending on the application. In this case, the structure of the vehicle pane is symmetrical, and the connecting layer in particular comprises a multi-layer structure of various PVB and other foils.

In detail, a first PVB foil 21' is applied to the first pane 10, in which a strip-shaped light emitting arrangement 30 is arranged in the edge region. This is slightly pressed into the PVB foil, with the components of this first light emitting arrangement facing away from the pane 10. A second PVB foil 23 is now applied to the components, which is printed with scattering particles at least in the inner region. The optoelectronic components are thus enclosed by this second PVB foil 23. A further light strip is now arranged on the PVB foil in the edge region, with its components again facing the components of the first light strip and thus the PVB foil 23. A liquid crystal (LC, or PDLC) or electrochromic foil 22 is arranged in the center of the inner region and covered by a third PVB foil 21. The third PVB foil also encloses the other second light strip 30 in the edge region of the structure. Finally, a second glass foil is applied.

After production in this way, the two panes are laminated together by heating and pressure via the various PVB foils so that a uniform connecting layer 20 is formed. In particular, the second PVB foil 23 acts as an optical waveguide and guides the light emitted by the optoelectronic components into the inner region of the vehicle pane structure.

As in the previous embodiment, the edge region 2 is surrounded by a diffuser and reflector layer 40, so that light emitted by the components in this direction is deflected back into the connecting layer 20 and from there into the inner region 2. The scattering particles in the layer 23 in the inner region in turn ensure that the light is decoupled in the direction of the user.

Figures 3, 4:
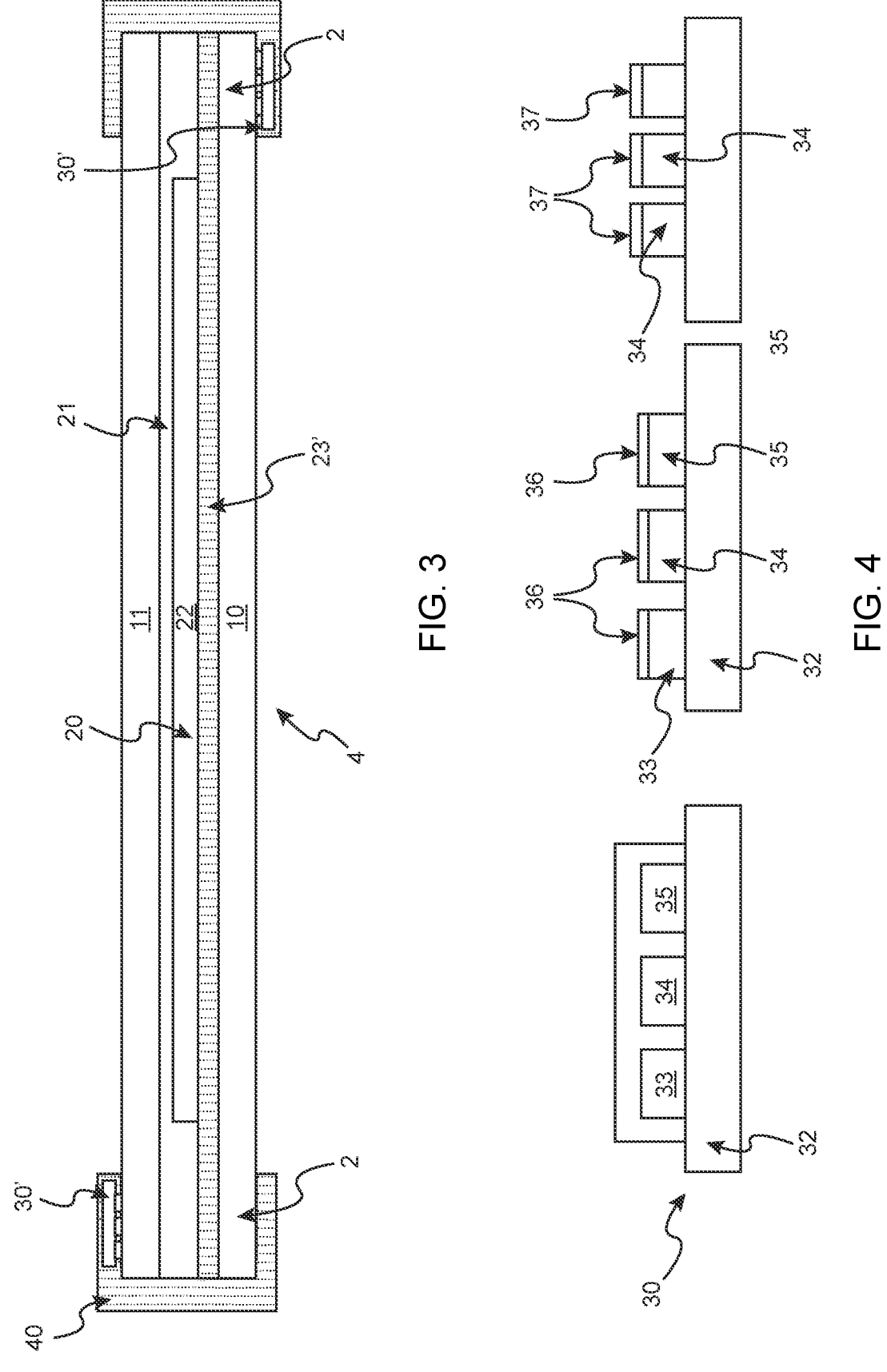
FIG. 3 shows a third embodiment of a vehicle pane with some aspects of the proposed principle.
FIG. 4 shows a cross-section of various embodiment of light emitting arrangements as they can be used in a vehicle pane according to the proposed principle.

FIG. 3 shows a further embodiment of the proposed principle, in which the light emitting arrangements 30 are arranged outside the connecting layer 20. This allows the structure 4 to be manufactured separately and the light emitting arrangements 30 to be provided subsequently as required.

In this embodiment, the light emitting arrangements are arranged as strip-shaped elements on two different sides of the pane 11 and 10. The optoelectronic components each face the pane and are embedded within the reflector structure 40. To ensure good coupling here, an adhesive or a silicone layer can be provided to attach the components and the light strip to the pane. During operation, the components shine through the respective glass layer into the connecting layer, 20, where they are deflected by scattering particles of the layer 23 in the direction of the inner region area, thus creating ambient and indirect lighting. In this context, the foil 23 extends to the edge. The edge can again be reflective in order to direct as much light as possible into the connecting layer. The glass layer opposite the respective components can also be covered with a reflective layer.

FIG. 4 shows some embodiments of light emitting arrangements 30, such as those that can be used in vehicle panes according to the proposed principle.

The illustration on the right shows a cross-section of a strip-shaped light emitting arrangement, each comprising three optoelectronic components 33, 34 and 35. These are configured to emit light of different wavelengths and form a single pixel consisting of 3 subpixels of the colors green, blue and red. The components are arranged in a row in plan view, but other arrangements can also be provided, for example offset from each other, so that their centers would form a triangle in plan view. In the case of a strip with several of these components, the different colors can also be permuted, which may produce a more uniform color impression.

In addition, the optoelectronic components are encapsulated by an optional reflector layer, which deflects the light through the transparent foil 32 and thus produces an initial color mixing. The color mixing already on the light emitting arrangement produces a more homogeneous color distribution, so that a uniform mixed light is created in the inner region for an observer.

In the central arrangement of the light emitting arrangement shown, the individual optoelectronic components 33, 34 and 35 are each provided with a mirror 36 on the surface. Such a mirror can, for example, be designed as a Bragg mirror and reflects the light emitted in the direction of the surface back into the component, so that these components emit light primarily to the side. To enhance such an effect, the flexible foil 32 of the arrangement is also provided with a reflector layer, which also reflects the light emitted downwards. In this way, the optoelectronic components shown in the middle embodiment work primarily as side emitters and emit light to the side.

Such an arrangement is expediently provided primarily within the connecting layer, so that the light is already emitted there in the connecting layer through the side emitters along the connecting layer and thus remains within the waveguide formed by the connecting layer. Such an embodiment thus increases the luminous efficacy within the connecting layer in such an arrangement. The embodiments in FIGS. 1 and 2 can be formed with such side emitters.

The right-hand embodiment, on the other hand, shows an arrangement in which the optoelectronic components 430 each have the same design and are surrounded or covered by a converter layer 30. The converter layer converts the light emitted by the components into light of a second wavelength, resulting in a mixed light if the converter material 37 is suitably selected and of a suitable thickness. For example, when using blue LEDs with a suitable converter material, white light can be generated.

Figures 5, 6:
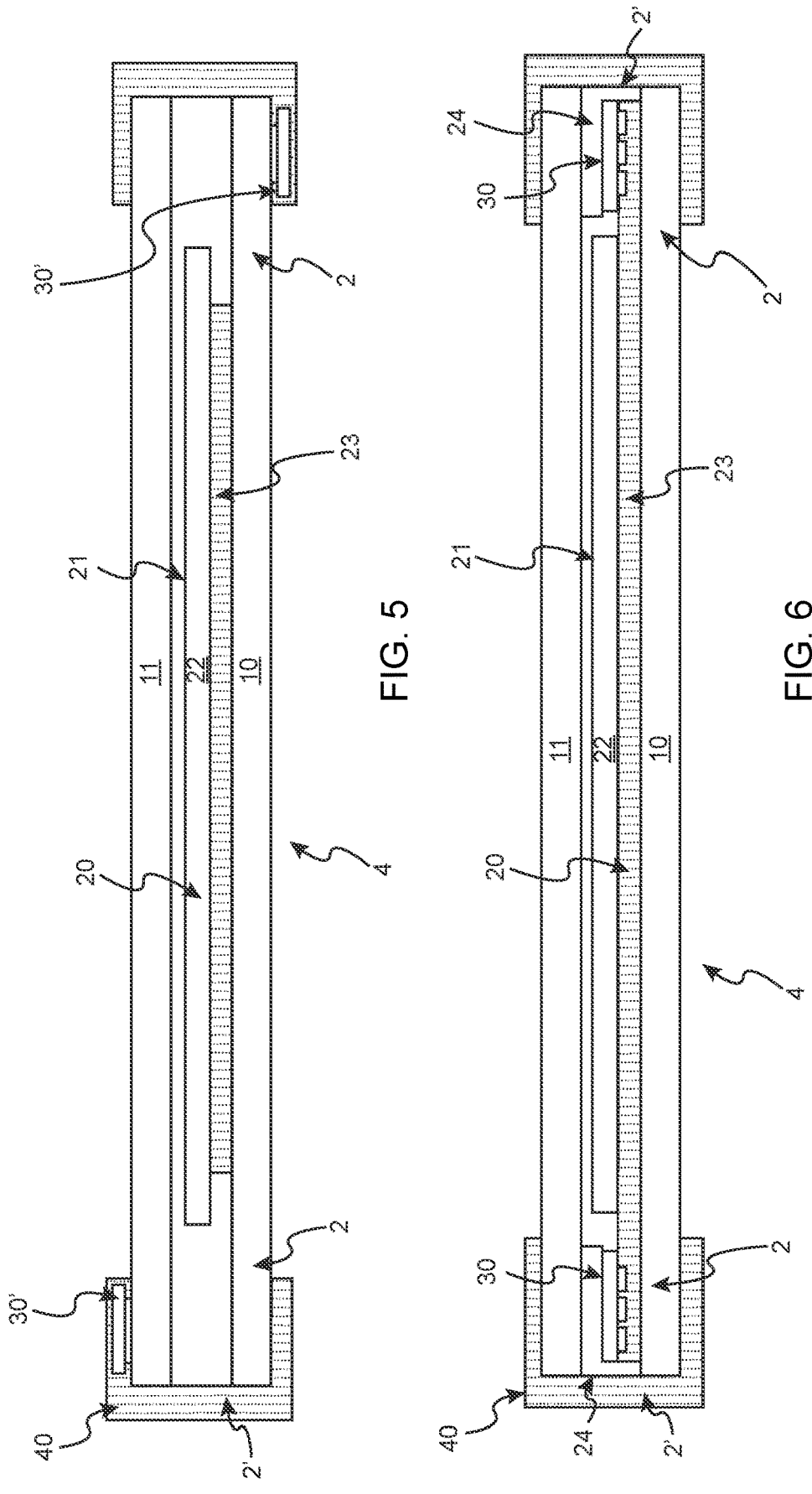
FIG. 5 shows a fourth embodiment of a vehicle pane with some aspects of the proposed principle.
FIG. 6 shows a fifth embodiment of a vehicle pane with some aspects of the proposed principle.

FIG. 5 shows a further embodiment in which the scattering particles on the PVB foil 23 are only partially present in the inner region. Such a foil can either be produced directly by suitable printing with scattering particles, but it is also possible to arrange only the foil itself in the inner region of the structure and to provide further foil portions in the edge region. Moreover, in this embodiment, the individual optoelectronic components of the light arrangements 30' are not arranged next to each other as in the previous embodiments, but one behind the other, i.e. into or out of the drawing plane.

Depending on the design and control of the optoelectronic components in columns or rows, either a mixed light that is as homogeneous as possible or a suitable color distribution or color gradients within the inner region can be displayed. In this respect, the light emitting arrangements can have different components arranged in rows and columns, whereby components with different colors can be placed at the positions so that they permute.

FIG. 6 shows a further embodiment of the proposed principle. In this case, converter particles are provided within the foil 23, which generate a mixed light from the light emitted by the optoelectronic components of the light emitting arrangement 30. In order to deflect this light as extensively as possible into the inner region, the light emitting arrangement is surrounded by a reflector material 24 on the respective adjacent side edge. This material is also located on the side of the foil of the light emitting arrangement 30 facing away from the components.

In some embodiments, the reflector material 24 is designed as a corresponding foil within the connecting layer. For example, a corresponding PVB foil can be provided, which partially contains the reflector material and reflector particles at the respective position in the edge region. Alternatively, corresponding additional foils 24 are also possible, each of which is arranged in the edge region. In this way, the light emitting arrangement 30 is additionally encapsulated so that the light propagates in the connecting layer 20, which acts as a waveguide, and is deflected outwards by the scattering particles in the inner region. Depending on the design of the reflective material 24, the additional diffuser and reflector layer 40 can also be dispensed with. In these embodiments, the edge region is sufficiently reflective, so that only the holder is provided for the edge region.

Figure 7:
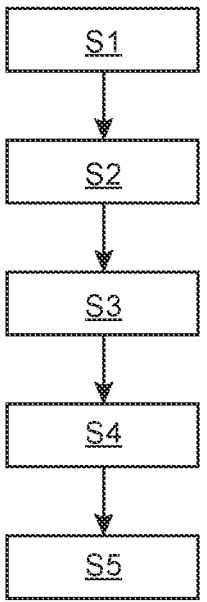
FIG. 7 shows various steps in the process of manufacturing a vehicle pane according to the proposed principle.

FIG. 7 shows in various steps an example of a process according to the proposed principle. In step S1, a first pane 10 is provided for the manufacture of the structure, to which a PVB foil is applied. Depending on the configuration, this PVB foil can be tinted and thus partially transparent or untinted and thus have a higher transmittance. A second PVB foil with printed scattering particles is arranged on the PVB foil in step S2. The second PVB foil is approximately 40 μm thick, with the scattering particles facing the first pane itself.

In the optional step S3, an electrochromic or other adjustable foil that changes the reflection and absorption properties can now be provided on such an arrangement in the inner region. In addition, at the same time or in different steps, a light emitting arrangement 30 is introduced into the edge region surrounding the inner region. The light emitting arrangement comprises a flexible foil on which optoelectronic components with their leads are arranged.

The light emitting arrangement 30 can either be lightly pressed into the PVB foil with the optoelectronic components first. Alternatively, the flexible foil can be placed directly on the PVB foil so that the components face upwards. In this method, the components are designed as side emitters and thus emit the light they emit to the side. In a subsequent step S4, a second PVB foil is applied to the components or the foil, which also fills the inner region. A second pane is then applied in step S5 and this structure is intimately bonded together using heat and pressure. This melts the individual connecting layers and may cause them to partially mix, resulting in a continuous connecting layer of the structure, in the edge region of which the light emitting arrangement is integrated within this connecting layer. The components emit the light to the side.

Finally, in step S6, the edge region is surrounded by a reflective layer so that it deflects the light emitted in the direction of the edge regions towards the components in the direction of the inner region.

The embodiments shown here and their individual features can be combined with each other as desired. For example, it is possible to specify different reflector materials in the connecting layer or also on the pane in the edge region, which are intended to deflect the light along the connecting layer. The structure of the light emitting arrangement and the use of the optoelectronic components described here as well as the individual layers of the connecting layer are flexible. Thus, more than the PVB layers mentioned in the embodiments can be used. Several printed foils can also be used. Scattering particles can also be applied in other ways during production if printing on a foil does not seem appropriate. In addition to a PVB foil, other suitable materials can also be used, including liquid adhesives if necessary.

In addition to the two panes described here, other panes are also possible so that multi-layer systems can be constructed. In the connecting layers, light emitting arrangements can also be provided in the edge region. Although in this context the term "in the edge region" is usually equated with "within the connecting layer", this can also mean on the pane within the edge region. However, arrangements in which the optoelectronic components are arranged along the side edge of the edge region are explicitly excluded. However, it is essential that the connecting layer acts as a waveguide so that light emitted in or at the edge region is guided into the inner region. The arrangement of the optoelectronic components in the connecting layer or laterally on the pane ensures that as much light as possible is coupled into the connecting layer.

REFFERENCE LIST

1 vehicle pane
2 edge region
3 inner region
4 structure
10, 11 pane
20 connection layer
21 PVB foil
22 LC foil
23 PVB foil with scattering particles
24 reflective material
23' layer with scattering and/or converter particles
30 light emitting arrangement
32 flexible foil
33, 34, 35 optoelectronic components
36 reflector, Bragg mirror
37 converter material
40 reflector layer

The invention claimed is:

1. A vehicle pane, comprising:
  a light emitting arrangement comprising a plurality of optoelectronic components on a flexible foil; and
  a structure comprising a first pane, a second pane arranged thereon, and at least one at least partially transparent connecting layer which connects the first pane and the second pane to one another;
  wherein the structure comprises an at least partially transparent inner region and an edge region surrounding the inner region; and
  wherein the light emitting arrangement is arranged laterally between the first pane and the second pane in the edge region of the structure and the edge region with the light emitting arrangement is configured to direct light generated by the optoelectronic components along the at least partially transparent connecting layer into the at least partially transparent inner region, with the connecting layer functioning as a light guide.

2. The vehicle pane according to claim 1, further comprising a reflector layer covering a surface of the edge region of the structure at least along a longitudinal edge of the structure.

3. The vehicle pane according to claim 1, wherein the light emitting arrangement is arranged within the at least partially transparent connecting layer in the edge region in such a way that the optoelectronic components are located in the at least partially transparent connecting layer.

4. The vehicle pane according to claim 1, wherein the light emitting arrangement is arranged laterally on at least one of the first and second pane in such a way that the optoelectronic components face the at least partially transparent connecting layer.

5. The vehicle pane according to claim 1, wherein the flexible foil is configured as a reflective foil or comprises a reflective back surface.

6. The vehicle pane according to claim 1, wherein the optoelectronic components are arranged on the flexible foil such that a lateral distance of two adjacent optoelectronic components to a center of the inner region of the structure in a cross-section through the light emitting arrangement is different.

7. The vehicle pane according to claim 1, wherein the optoelectronic components are arranged on the flexible foil in at least one row along the edge region.

8. The vehicle pane according to claim 1, wherein the optoelectronic components each comprise semiconductor chips configured to emit light of different wavelengths, in particular red, green and blue.

9. The vehicle pane according to claim 1, wherein the optoelectronic components each comprise semiconductor chips comprising a converter material for generating a mixed light, in particular a white light.

10. The vehicle pane according to claim 1, wherein the at least partially transparent connecting layer comprises converter particles for generating mixed light.

11. The vehicle pane according to claim 1, wherein the at least partially transparent connecting layer comprises scattering particles which are inhomogeneously distributed, in particular for generating an illumination pattern.

12. The vehicle pane according to claim 1, wherein the at least partially transparent connecting layer comprises a foil printed with scattering particles, the printed side of which is in particular adjacent to one of the first and second pane.

13. The vehicle pane according to claim 1, wherein the at least partially transparent connecting layer comprises a transparency-adjustable foil arranged in the inner region, in particular a foil with liquid crystals or an electrochromic foil.

14. The vehicle pane according to claim 1, wherein the at least partially transparent connecting layer comprises an at least partially transparent plastic foil, which is optionally at least partially tinted in the inner region.

15. The vehicle pane according to claim 1, wherein the material of the at least partially transparent connecting layer comprises polyvinyl butyral (PVB) or another plastic from the group of polyvinyl acetals.

16. The vehicle pane according to claim 1, wherein in the edge region the at least partially transparent connecting layer comprises a reflective material arranged between an edge of the edge region and the light emitting arrangement to reflect emitted light into the inner region.

17. The vehicle pane according to claim 16, in which the reflective material is arranged on a side of the flexible foil facing away from the optoelectronic components.

18. The vehicle pane according to claim 16, wherein the reflective material is formed by reflective foil portions.

19. The vehicle pane according to claim 1, wherein the thickness of the at least partially transparent connecting layer is between 40 μm and 400 μm.

20. The vehicle pane according to claim 1, in which the optoelectronic components are configured as side emitters, and in particular comprise a reflective element, in particular in the form of a bragg mirror on a surface.

21. A method of manufacturing a vehicle pane having an inner region and an edge region surrounding the inner region, comprising the steps of:
   providing a first pane and a second pane;
   applying a first at least partially transparent foil layer on the first pane;
   applying a second foil layer which at least partially comprises scattering particles at least in the inner region;
   arranging a light emitting arrangement, in particular in the form of a strip with a flexible foil and optoelectronic semiconductor components arranged thereon, in the edge region on one or more of the first foil layer or the second foil layer;
   applying a third, at least partially transparent foil layer to the second foil layer and the light emitting arrangement such that the light emitting arrangement is completely covered;
   arranging the second pane on the third foil layer; and
   bonding the first and second panes together by melting the foil layers, the optoelectronic semiconductor components of the light emitting arrangement being located within a connecting layer created by the foil layers;
      wherein the light emitting arrangement is arranged laterally between the first pane and the second pane in the edge region of a structure comprising the first pane, second pane, and the connecting layer; and
      wherein the edge region with the light emitting arrangement is configured to direct light generated by the optoelectronic components along the connecting layer into the inner region, with the connecting layer functioning as a light guide.

22. The method according to claim 21, further comprising a step of applying at least one of a diffuser or a reflector layer which covers a surface of the first and second pane in the edge region at least along a longitudinal edge of the first pane and the second pane.

23. The method according to claim 21, wherein the flexible foil is configured as a reflective foil or comprises a reflective back surface.

24. The method according to claim 21, further comprising a step of arranging a transparency-adjustable foil on one of the first or second foil layer in the inner region, in particular a foil with liquid crystals or an electrochromic foil.

25. The method according to claim 21, wherein the step of applying the second foil layer comprises applying a foil printed with scattering particles for generating an illumination pattern.

26. The method according to claim 21, further comprising a step of arranging a reflective material, in particular a reflective foil portion, in the edge region between an edge of the edge region and the light emitting arrangement in order to reflect emitted light into the inner region.

27. The method according to claim 21, wherein the optoelectronic components are arranged on the flexible foil such that a lateral distance of two adjacent optoelectronic components to a center of the inner region in a cross-section through the light emitting arrangement is different.

28. The method according to claim 21, wherein the optoelectronic components are arranged on the flexible foil in at least one row along the edge region.

29. The method according to claim 21, in which the optoelectronic components each comprise semiconductor chips which are configured to emit light of different wavelengths, in particular red, green and blue.

30. The method according to claim 21, wherein the optoelectronic components each comprise semiconductor chips comprising a converter material for generating a mixed light, in particular a white light; or wherein at least one of the first foil layer, the second foil layer, or the third foil layer comprises converter particles.

* * * * *